| United States Patent [19] | [11] Patent Number: 5,034,435 |
| --- | --- |
| Squiller et al. | [45] Date of Patent: Jul. 23, 1991 |

[54] AQUEOUSLY DISPERSED BLENDS OF EPOXY RESINS AND BLOCKED URETHANE PREPOLYMERS

[75] Inventors: Edward P. Squiller, Wheeling, W. Va.; Peter H. Markusch, McMurray, Pa.

[73] Assignee: Mobay Corporation, Pittsburgh, Pa.

[21] Appl. No.: 542,276

[22] Filed: Jun. 22, 1990

Related U.S. Application Data

[63] Continuation-in-part of Ser. No. 381,554, July 18, 1989.

[51] Int. Cl.$^5$ .............................................. C08L 63/00
[52] U.S. Cl. .................................. 523/415; 523/417; 523/414
[58] Field of Search ....................................... 523/415

[56] References Cited

U.S. PATENT DOCUMENTS

| 3,931,116 | 1/1976 | Bernstein et al. | 260/77.5 |
| --- | --- | --- | --- |
| 3,971,745 | 7/1976 | Carlson et al. | 260/29.2 |
| 4,036,906 | 7/1977 | Finelli | 260/830 |
| 4,160,065 | 7/1979 | Loewrigkeit et al. | 428/425 |
| 4,190,567 | 2/1980 | Ohmura et al. | 260/29.2 |
| 4,403,085 | 9/1983 | Christenson et al. | 528/45 |
| 4,522,851 | 6/1985 | Rosthauser | 427/386 |
| 4,826,894 | 5/1989 | Markusch et al. | 523/415 |

*Primary Examiner*—Lewis T. Jacobs
*Attorney, Agent, or Firm*—Joseph C. Gil; Thomas W. Roy

[57] ABSTRACT

The present invention is directed to an aqueously dispersed, ambient temperature curable composition containing
 (a) an epoxy resin which is rendered water-dispersible by chemically incorporated emulsifiers and/or by being admixed with external emulsifiers and
 (b) an isocyanate-terminated prepolymer
  (i) which is rendered water-dispersible by chemically incorporated emulsifiers and/or by being admixed with external emulsifiers,
  (ii) which is prepared from a mixture containing a polyisocyanate and a compound having a molecular weight of at least 500 and at least two hydroxyl groups and
  (iii) wherein the isocyanate groups are blocked with a phenolic compound.

The present invention is also directed to a process for preparing polyurethanes by reacting the above blends with polyamines at ambient or elevated temperature and to the polyurethanes produced therefrom.

18 Claims, No Drawings

AQUEOUSLY DISPERSED BLENDS OF EPOXY RESINS AND BLOCKED URETHANE PREPOLYMERS

CROSS REFERENCE TO RELATED APPLICATIONS

The subject application is a continuation-in-part of application, Ser. No. 07/381,554, filed July 18, 1989, now abandoned.

BACKGROUND OF THE INVENTION

1. Field of the Invention

The present invention is directed to aqueously dispersed blends of epoxy resins and isocyanate-terminated prepolymers blocked with phenolic blocking agents which may be cured with amines at ambient or elevated temperature to produce coatings, sealants, caulks and elastomers with improved flexibility.

2. Description of the Prior Art

It is known to cure epoxy resins with amines in order to provide high molecular polymers with excellent properties. One of the deficiencies of these polymers is that they do not possess sufficient flexibility for all potential applications. While it is known that polyurethane resins such as isocyanate-terminated prepolymers may be cured with amines to form flexible polymers, blends of these prepolymers and/or epoxy resins with amines are not storage stable and are generally too viscous to use in spray applications.

Reducing the viscosity of these blends with organic solvents is not an acceptable solution because the presence of organic solvents in spray systems is not desirable for environmental reasons. The use of water as a solvent would overcome these difficulties, but the isocyanate-terminated prepolymers are not stable in water. The terminal isocyanate groups react with the water to form amino groups which subsequently react with the dispersed epoxy resin to form fully reacted systems. Blocking the isocyanate groups of the prepolymer with blocking agents would prevent premature reaction of the prepolymers with the epoxy resins, but these systems would not be curable at room temperature because elevated temperatures would be necessary to release the blocking agent.

Accordingly, an object of the present invention is to provide blends of blocked isocyanate-terminated prepolymers with epoxy resins which are storage stable, have an acceptable viscosity for spray applications and can be cured at ambient or elevated temperatures to provide fully reacted coatings, sealants, caulks and elastomers with improved flexibility.

Surprisingly these objects can be achieved in accordance with the present invention as described.

U.S. Pat. Nos. 4,160,065 and 4,190,567 are directed to the production of cationic polyurethane-ureas with terminal amino groups which are subsequently reacted with epoxy resins. U.S. Pat. Nos. 3,931,116 and 3,971,745 are directed to the production of anionic polyurethane-ureas having terminal amino groups which are subsequently chain extended with epoxy resins. U.S. Pat. No. 4,036,906 is directed to solvent-based blends of polyurethane prepolymers with epoxy resins which are subsequently chain extended with polyamines. U.S. Pat. No. 4,403,085 is directed to blends of blocked isocyanate-terminated prepolymers and epoxy resins which are subsequently cured to form films having improved properties. U.S. Pat. No. 4,522,851 is directed to blends of water-dispersible epoxy resins and water-dispersible blocked polyisocyanates which are cured to form coatings with improved impact resistance. Finally, U.S. Pat. No. 4,826,894 is directed to the incorporation of epoxy resins into aqueous polyurethane dispersions in order to improve the humidity resistance of coatings prepared therefrom.

SUMMARY OF THE INVENTION

The present invention is directed to an aqueously dispersed, ambient temperature curable composition containing (a) an epoxy resin which is rendered water-dispersible by chemically incorporated emulsifiers and/or by being admixed with external emulsifiers and (b) an isocyanate-terminated prepolymer
 (i) which is rendered water-dispersible by chemically incorporated emulsifiers and/or by being admixed with external emulsifiers,
 (ii) which is prepared from a mixture containing a polyisocyanate and a compound having a molecular weight of at least 500 and at least two hydroxyl groups and
 (iii) wherein the isocyanate groups are blocked with a phenolic compound.

The present invention is also directed to a process for preparing polyurethanes by reacting the above blends with polyamines at ambient or elevated temperature and to the polyurethanes produced therefrom.

DETAILED DESCRIPTION OF THE INVENTION

In accordance with the present invention an isocyanate-terminated prepolymer which has been rendered hydrophilic by the chemical incorporation of ionic and/or non-ionic hydrophilic groups and/or by mixing with external emulsifiers is used to prepare the blend with the epoxy resin.

Examples of suitable polyisocyanates to be used in preparing the isocyanate-terminated prepolymers in accordance with the present invention are organic diisocyanates represented by the general formula

in which R represents an organic group obtainable by removal of the isocyanate groups from an organic diisocyanate having a molecular weight of from about 112 to 1,000, and preferably from about 140 to 400. Diisocyanates preferred for the process according to the invention are those represented by the general formula indicated above in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6–15 carbon atoms. Examples of the organic diisocyanates which are particularly suitable for the process include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis(4-isocyanatocyclohexyl)methane, 1,3- and 1,4-bis(isocyanatomethyl)- cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenylmethane diisocyanate, 1,5-diisocyanate naphthylene, 4,4',4''-triphenylmethane diisocyanate and polyphenyl polymethylene polyisocyanates obtained by phosgenating aniline/formaldehyde condensates. Mixtures of diisocyanates can, of course, be used. Preferred diisocyanates are 1,6-hexamethylene diisocyanate, isophorone diisocyanate, bis-(4-isocyanatocyclohexyl)-methane, 2,4- and/or 2,6-toluylene diisocyanate and 2,4'- and/or 4,4'-diphenylmethane diisocyanate.

The organic compounds containing at least two isocyanate-reactive groups which are reacted with the previously described organic diisocyanates to prepare the isocyanate-terminated prepolymers can be divided into two groups, i.e., high molecular weight compounds with molecular weights from 400 to about 6,000, preferably from 800 to about 3,000, and low molecular weight compounds with molecular weights below 400. The molecular weights are number average molecular weights ($M_n$) and are determined by end group analysis (OH number). Examples of the high molecular weight compounds are polyester polyols, polyether polyols, polyhydroxy polycarbonates, polyhydroxy polyacetals, polyhydroxy polyhydroxy polyester amides and polyhydroxy polythioethers. The polyester polyols, polyether polyols and polyhydroxy polycarbonates are preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylolpropane. The polyesters may also contain a portion of carboxyl end groups. Polyesters of lactones, e.g. ε-caprolactone or hydroxycarboxylic acids, e.g. ω-hydroxycaproic acid, may also be used.

Polycarbonates containing hydroxy groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained form the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide; propylene oxide; butylene oxide; styrene oxide; tetrahydrofuran or epichlorohydrin or with mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris(hydroxylphenyl)-ethane.

Polyethers which have been obtained by the reaction of starting compounds containing amine compounds can also be used, but are less preferred for use in the present invention. Suitable amine starting compounds include: ammonia, methyl amine, tetramethylene diamine, ethanolamine, diethanolamine, triethanolamine, ethylene diamine, diethylene triamine, triethylene tetramine, 1,6-hexane diamine, piperazine, 2,5-dimethyl piperazine, 1-amino-3-aminomethyl-3,3,5-trimethyl cyclohexane, bis-(4-aminocyclohexyl)-methane, bis-(4-amino3-methylcyclohexyl).methane, 1,4-cyclohexane diamine, 1,2-propane diamine, hydrazine, aminoacid hydrazides, hydrazides of semicarbazido carboxylic acids, bis-hydrazides, bis-semicarbazides, aniline, phenylene diamine, 2,4- and 2,6-toluylene diamine, polyphenylene polymethylene polyamines of the kind obtained by the aniline/formaldehyde condensation reaction and mixtures thereof. Resinous materials such as phenol and cresol resins may be used as the starting materials.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Patent No. 1,152,536). Also suitable as polyethers are amino polyethers wherein at least a portion of the hydroxyl groups of the previously described polyethers are converted to amino groups.

The preferred starting compounds for the polyethers are those compounds which exclusively contain hydroxyl groups, while compounds containing tertiary amine groups are less preferred and compounds containing isocyanate-reactive -NH groups are much less preferred.

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from aldehydes, e.g. formaldehyde, and glycols such as diethylene glycol, triethylene glycol, ethoxylated 4,4'-dihydroxy-diphenyldimethylmethane, and hexanediol-(1,6). Polyacetals suitable for the purpose of the invention may also be prepared by the polymerization of cyclic acetals.

Suitable polyhydroxy polyester amides and polyamines are, for example, the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic s acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

The compositions may also contain a low molecular weight isocyanate-reactive component having an average molecular weight of up to 400. The low molecular weight compounds which may optionally be used in combination with the high molecular weight isocyanate reactive compounds for the preparation of the isocyanate-terminated prepolymers include, for example, the polyhydric alcohols and polyamines which have been described for the preparation of the polyester polyols and polyether polyols. Dihydric alcohols are the preferred low molecular weight isocyanate-reactive component for preparing the isocyanate-terminated prepolymers.

In addition to the above-mentioned components which are preferably difunctional in the isocyanate polyaddition reaction, monofunctional and also trifunctional and higher functional components generally known in polyurethane chemistry, such as trimethylolpropane or glycerine, may be used to provide branching of the isocyanate-terminated prepolymer.

In order to enable the isocyanate-terminated prepolymers to be stably dispersed in an aqueous medium, ionic potential ionic groups and/or lateral or terminal, hydrophilic ethylene oxide units are chemically incorporated into the prepolymers. The ionic or potential ionic groups are incorporated in an amount sufficient to provide an ionic group content of up to about 120 milliequivalents, preferably about 10 to 80 milliequivalents, more preferably about 10 to 60 milliequivalents and most preferably about 10 to 30 milliequivalents per 100 g of prepolymer. The content of hydrophilic ethylene oxide units may be up to about 10%, preferably up to about 8%, more preferably about 1 to 6% and most preferably about 2 to 6%, by weight, based on the weight of the polyurethane-urea.

It is also possible, although less preferred, to use external emulsifiers instead of or in admixture with the previously described chemically incorporated hydrophilic groups. The external emulsifiers may be anionic, cationic or nonionic. Examples of these emulsifiers are discussed hereinafter as suitable external emulsifiers for the epoxy resins.

Suitable compounds for incorporating ionic or potential ionic groups include (i) monoisocyanates or diisocyanates which contain ionic or potential ionic groups and (ii) compounds which are monofunctional or difunctional in the isocyanate-polyaddition reaction and contain ionic or potential ionic groups.

The potential ionic groups or their corresponding ionic groups may be cationic or anionic, although the anionic groups are preferred. Examples of anionic groups include $-COO^\ominus$ and $-SO_3^\ominus$. Examples of cationic groups include

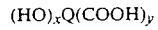

These ionic groups are formed by neutralizing the corresponding potential ionic groups either prior to, during or after forming the isocyanate-terminated prepolymer. When the potential ionic groups are neutralized prior to forming the isocyanate-terminated prepolymer, the ionic groups are incorporated directly. When neutralization is performed subsequent to forming the prepolymer, potential ionic groups are incorporated.

Suitable compounds for incorporating the previously discussed carboxylate, sulfonate and quaternary nitrogen groups are described in U.S. Pat. Nos. 3,479,310, 4,303,774 and 4,108,814, the disclosures of which are herein incorporated by reference. Suitable compounds for incorporating tertiary sulfonium groups are described in U.S. Pat. No. 3,419,533, also incorporated by reference. The neutralizing agents for converting the potential ionic groups to ionic groups are also described in the above-mentioned U.S. patents. Within the context of this invention, the term "neutralizing agents" is meant to embrace all types of agents which are useful for converting potential ionic groups to ionic groups. Accordingly, this term also embraces quaternizing agents and alkylating agents.

The preferred sulfonate groups for incorporation into the isocyanate-terminated prepolymers are the diol sulfonates disclosed in U.S. Pat. No. 4,108,814.

The preferred carboxylate groups for incorporation into the isocyanate-terminated prepolymer are derived from hydroxy-carboxylic acids of the general formula $$(HO)_xQ(COOH)_y$$

wherein

Q represents a straight or branched, hydrocarbon radical containing 1 to 12 carbon atoms, and x and y represents values from 1 to 3.

Examples of these hydroxy-carboxylic acids include citric acid and tartaric acid.

The preferred acids are those of the above-mentioned formula wherein $x=2$ and $y=1$. These dihydroxy alkanoic acids are described in U.S. Pat. No. 3,412,054, herein incorporated by reference. The preferred group of dihydroxy alkanoic acids are the $\alpha,\alpha$-dimethylol alkanoic acids represented by the structural formula:

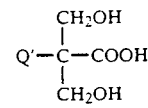

wherein Q' is hydrogen or an alkyl group containing 1 to 8 carbon atoms. The most preferred compound is $\alpha,\alpha$-dimethylol propanol propionic acid, i.e. when Q' is methyl in the above formula.

Suitable compounds for incorporating the lateral or terminal, hydrophilic ethylene oxide units may be either monofunctional or difunctional in the context of the isocyanate-polyaddition reaction and include (i) diisocyanates which contain lateral, hydrophilic ethylene oxide units, (ii) compounds which are difunctional in the isocyanate-polyaddition reaction and contain lateral, hydrophilic ethylene oxide units, (iii) monoisocyanates which contain terminal, hydrophilic ethylene oxide units, (iv) compounds which are monofunctional in the isocyanate-polyaddition reaction and contain terminal, hydrophilic ethylene oxide units, and (v) mixtures thereof.

The preferred difunctional hydrophilic components having lateral hydrophilic chains containing ethylene oxide units include compounds corresponding to the following general formula:

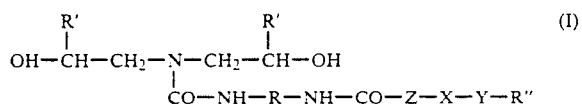  (I)

and/or compounds corresponding to the following general formula:

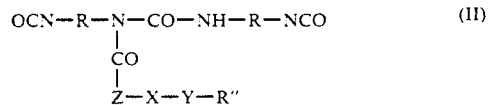  (II)

Preferred difunctional hydrophilic components are those corresponding to general formula (I) above.

In general formulae (I) and (II) above,

R represents a difunctional radical of the type obtained by removing the isocyanate groups from a diisocyanate corresponding to the general formula:

of the above-mentioned type;

R' represents hydrogen or a monovalent hydrocarbon radical containing from 1 to 8 carbon atoms, preferably a hydrogen atom or a methyl group;

R" represents a monovalent hydrocarbon radical having from 1 to 12 carbon atoms, preferably an unsubstituted alkyl radical having from 1 to 4 carbon atoms;

X represents the radical obtained by removal of the terminal hydroxyl group from a polyalkylene oxide chain having from about 5 to 90 chain members, preferably from about 20 to 70 chain members, of which at least about 40%, preferably at least about 65%, comprises ethylene oxide units and the remainder comprises other alkylene oxides such as propylene oxide, butylene oxide or styrene oxide units, preferably propylene oxide units;

Y represents oxygen or -NR'''- wherein R''' has the same definition as R"; and

Z represents a radical which corresponds to Y, but may additionally represent -NH-.

The compounds corresponding to general formulae (I) and (II) above may be produced by the methods according to U.S. Pat. Nos. 3,905,929 and 3,920,598 (the disclosures of which are herein incorporated by reference). In addition to the disclosures of these two patents, it is noted that instead of using the monofunctional polyether alcohols mentioned therein as starting materials, it is also possible to use those of the type where the polyether segment, in addition to ethylene oxide units, also contains up to 60%, preferably up to 35%, by weight based on polyether segment, of other alkylene oxide units such as propylene oxide, butylene oxide or styrene oxide units, preferably propylene oxide units. The presence of such "mixed polyether segments" may afford specific advantages in certain cases. These "mixed polyether segments" are described in U.S. Pat. No. 4,190,566, the disclosure of which is herein incorporated by reference.

Other particularly preferred hydrophilic components for incorporating lateral or terminal hydrophilic chains containing ethylene oxide units include compounds corresponding to the following general formula:

H-Y'-X-Y-R"

and/or compounds corresponding to the following general formula:

OCN-R-NH-CO-Z-X-Y-R"

wherein X, Y, Z, R and R" are as defined above; and Y' corresponds in its meaning to Y, but may additionally represent -NH-.

Monofunctional polyethers are preferably used, but preferably only in molar quantities of 10%, based on the polyisocyanate used, to guarantee the required high molecular weight structure of the polyurethane. In cases where relatively large molar quantities of monofunctional alkylene oxide polyethers are used, it is preferred to also use trifunctional compounds containing isocyanate-reactive hydrogen atoms in order to maintain an average functionality of at least 2.

The monofunctional hydrophilic components are produced in accordance with the processes described in U.S. Pat. Nos. 3,905,929 and 3,920,598 by alkoxylating of a monofunctional starter, such as n-butanol, using ethylene oxide and optionally another alkylene oxide, for example propylene oxide. The resultant product may be optionally further modified (although this is less preferred) by reaction with excess quantities of diisocyanates or by reaction with ammonia to form the corresponding primary aminopolyethers.

The isocyanate-terminated prepolymers of the present invention are prepared by reacting the polyisocyanate component with the high molecular weight organic component containing at least 2 isocyanate-reactive groups and the following optional components, i.e. the low molecular weight organic component containing at least 2 isocyanate-reactive groups, the component containing at least one ionic group or at least one potential anionic group and the component containing the hydrophilic ethylene oxide units. The potential ionic groups are groups which may be converted to ionic groups by treatment with neutralizing agents. The ratio of isocyanate groups to isocyanate-reactive groups is maintained between about 1.1 to 5, preferably about 1.2 to 3 and most preferably about 1.3 to 2.0 on an equivalent basis. The above components may be reacted simultaneously or sequentially to produce the isocyanate-terminated prepolymer. Simultaneous reaction will lead to the production of random copolymers, whereas a sequential-type reaction will lead to the production of block copolymers. The order of addition of the compounds containing isocyanate-reactive hydrogen(s) in the sequential-type reaction process is not critical; however, during the reaction of these compounds it is especially preferred to maintain an excess of isocyanate groups in order to control the molecular weight of the prepolymer and prevent high viscosities.

The reaction temperature during prepolymer production is normally maintained below about 150° C., preferably between about 50° and 130° C. The reaction is continued until the content of unreacted isocyanate groups decreases to the theoretical amount or slightly below. The finished prepolymer should have a free isocyanate content of about 1 to 20%, preferably about 1 to 10% by weight, based on the weight of prepolymer solids. It is possible to conduct the prepolymer reaction in the presence of catalysts known to accelerate the reaction between isocyanate groups and isocyanate-reactive groups, such as organo-tin compounds, tertiary amines, etc.; however, the use of a catalyst is generally not necessary and it is often preferred to conduct the reaction without a catalyst.

The prepolymers may be prepared in the presence of solvent provided that the solvent is substantially nonreactive in the context of the isocyanate-polyaddition reaction. The solvents are generally organic and may be comprised essentially of carbon and hydrogen with or without other elements such as oxygen or nitrogen. While it may not be necessary to employ a solvent during formation of the isocyanate-terminated prepolymer, the use of a solvent may be desirable to maintain the reactants in the liquid state as well as to permit better temperature control during the reaction by serving as a heat sink and, if desired, as a refluxing medium. Solvents which may be employed include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons, and the like, and mixtures thereof.

The amount of solvent employed should be sufficient to provide a prepolymer solution having a sufficiently low viscosity to enhance the formation of the dispersion; however, the solutions may be successfully employed in forming the dispersions even though the viscosity of the solution is relatively high at the temperature of dispersion. Such viscosities may be as low as 100 centipoise or above 10,000 centipoise, e.g. as high as 50,000 centipoise, preferably 40,000 centipoise, and only mild agitation need be employed to form the dispersion, even in the absence of an external emulsifying agent. It is possible to use about 0.01 to 50 parts by weight of solvent, preferably about 0.1 to 10 parts by weight of solvent, per part by weight of the prepolymer. However, the presence of a solvent for the prepolymer is not necessary to provide a stable, aqueous dispersion. Often, when solvent is employed during the preparation of the isocyanate. terminated prepolymer, it is desirable to remove at least a portion of the solvent form the aqueous dispersion. Advantageously, the solvent to be removed from the dispersion has a lower boiling point than water and thus can be removed from the dispersion by, for example, distillation. The removal of the low boiling solvent is desirably conducted under conditions which are not deleterious to the dispersed prepolymer such as by vacuum distillation. A solvent having a higher boiling point than water such as dimethyl formamide, N-methyl-2-pyrrolidinone, and the like may be employed, in which case, the higher boiling solvent is generally retained in the polyurethane-urea aqueous dispersion polymer to enhance the coalescence of the polyurethane-urea particles during film formation.

In order to convert the preferred potential anionic groups to anionic groups either before, during or after their incorporation into the prepolymers, either volatile or non-volatile cations are used to form the counterions of the anionic groups. Volatile cations are those wherein at least about 90% of the basic organic compounds used to form the counterion of the anionic group volatilize under the conditions used to cure films based on the isocyanate-terminated prepolymers, preferably at least about 90% of the basic organic compounds volatilize when films formed from the prepolymers are cured under ambient conditions. Nonvolatile cations are those wherein at least about 90% of the cations do not volatilize under the conditions used to cure films formed from the isocyanate-terminated prepolymers, preferably at least about 90% of the cations do not volatilize when films formed from the prepolymers are cured under ambient conditions. As the amount of counterions formed from volatile basic organic compounds increases, the resistance to water swell of coatings or films based on the prepolymers is further improved; whereas, as the amount of counterions formed from nonvolatile cations increases, the hydrolytic stability of films or coatings based on the prepolymers is further improved. Therefore, it is possible to control the properties of the finally produced coatings or films by simply controlling the ratio between the volatile and nonvolatile cations used to form the counterions of the anionic groups.

Suitable volatile basic organic compounds for neutralizing the potential anionic groups are primary, secondary or tertiary amines. Of these the trialkylo substituted tertiary amines are preferred. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyl-diethanol amine, dimethylaminopropanol, 2-methoxyethyldimethyl amine, N-hydroxyethylpiperazine, thylaminoethoxy)ethanol and 5-diethylamino-2-pentanone. The most preferred tertiary amines are those which do not contain active hydrogen(s) as determined by the Zerewitinoff test since they are capable of reacting with the isocyanate groups of the prepolymers which can cause gelation, the formation of insoluble particles or chain termination.

The more volatile tertiary amines are especially advantageous since the salts formed from these amines are capable of decomposing during film formation under ambient conditions with volatilization of the tertiary amine. Another advantage of these tertiary amines is that they do not take part in the isocyanate-polyaddition reaction. For example, when isocyanate-terminated prepolymers containing potential anionic groups are formed, it would be difficult to neutralize these groups prior to dispersion in water with primary or secondary amines due to the fact that these amines may react with the free isocyanate groups of the prepolymer. In this context, these amines act more like chain terminators or chain extenders than neutralizing agents, and make the subsequent high molecular weight build-up during the aqueous chain extension step more difficult and less predictable. Thus, if primary and secondary amines are used, they should preferably be used as neutralizing agents prior to the formation of the prepolymer, i.e., when the potential anionic groups are converted to anionic groups prior to their incorporation into the prepolymer. However, the tertiary amines are preferred even when neutralization is conducted in this manner.

Suitable nonvolatile cations include monovalent metals, preferably alkali metals, more preferably lithium, sodium and potassium and most preferably sodium. The cations may be used in the form of inorganic or organic salts, preferably salts wherein the anions do not remain in the dispersions such as hydrides, hydroxides, carbonates or bicarbonates.

When the potential cationic or anionic groups of the prepolymer are neutralized, they provide hydrophilicity to the prepolymer and better enable it to be stably dispersed in water. The potential or unneutralized ionic groups do not provide this degree of hydrophilicity. Accordingly, a sufficient amount of the potential ionic groups must be neutralized so that when combined with the hydrophilic ethylene oxide units and the optional external emulsifiers, the isocyanate-terminated prepolymer can be stably dispersed in water. Generally, at least about 75%, preferably at least about 90%, of the potential ionic groups are neutralized to the corresponding ionic groups. Larger amounts of potential ionic groups may remain unneutralized; however, there are no advantages to be gained from large quantities of unneutralized potential anionic groups and their presence could be detrimental by reducing the hydrolytic stability of polyurethanes prepared from the dispersions obtained in accordance with the present invention. When smaller amounts of potential ionic groups are incorporated, it may be necessary to neutralize substantially all of these groups to obtain the desired amount of hydrophilicity. No firm guidelines can be given as to the amount of ionic groups needed, since the dispersibility of the polyurethane-urea depends on many factors including, but not limited to, the amount of hydrophilicity provided by the ethylene oxide units and external emulsifiers, the desired particle size and the application requirements.

The neutralization steps may be conducted (1) prior to prepolymer formation by treating the component containing the potential ionic group(s), (2) after prepolymer formation, but prior to blocking the isocyanate groups of the prepolymer and/or (3) after blocking the isocyanate groups, but prior to dispersing the prepolymer.

The reaction between the neutralizing agent and the potential anionic groups may be conducted between about 20° and 150° C., but is normally conducted at temperatures below about 100° C., preferably between about 30° and 80° C. and most preferably between about 50° and 70° C., with agitation of the reaction mixture.

Prior to dispersing the isocyanate-terminated prepolymer in water, the isocyanate groups are blocked with a phenolic blocking agent, e.g., phenol or alkylated phenols such as nonylphenol, the cresols, the trimethyl phenols and the tert.-butyl phenols. The reaction between the isocyanate-terminated prepolymer and the blocking agent is conducted at a temperature of about 50° to 120° C., preferably about 70° to 100° C.

The water-dispersible epoxy resins used in accordance with the present invention have an average molecular weight of about 500 to 20,000 and are prepared from a dihydric phenol and the diglycidyl ether of a dihydric phenol. In order to provide hydrophilicity to the epoxy resin, either chemically incorporated or external emulsifiers are used. Suitable emulsifiers are anionic, cationic or nonionic. Both the dihydric phenol and the diglycidyl ether of a dihydric phenol may also contain other substituents such as alkyl, aryl, sulfido, sulfonyl, halo, etc.

Illustrative of suitable dihydric phenols are 2,2-bis(4-hydroxyphenyl)propane, 2,2-bis(3-bromo-4-hydroxyphenyl)propane, 2,2-bis(3-chloro-4-hydroxyphenyl)propane, bis(4-hydroxyphenyl)methane, bis(4-hydroxyphenyl)sulfone, bis(4-hydroxyphenyl)-sulfide, resorcinol, hydroquinone, and the like. The preferred dihydric phenols are 2,2-bis(4-hydroxyphenyl)propane (bisphenol A) and bis(4-hydroxyphenyl)methane for reasons of cost and availability.

The diglycidyl ether derivatives are prepared by the reaction of a dihydric phenol with a halogen-containing epoxide or dihalohydrin in the presence of an alkaline medium. By varying the ratios of the dihydric phenol and epichlorohydrin reactants, different molecular weight products can be obtained as described in U.S. Pat. Nos. 2,582,985; 2,615,007 and 2,633,458.

For purposes of the present invention, optionally at least a portion of the diglycidyl ether of dihydric phenol component can be replaced with a diglycidyl ether of a hydrogenated dihydric phenol derivative. For example, the said diglycidyl ether of dihydric phenol can have up to essentially 100 percent of its weight substituted by a diglycidyl alicyclic ether such as 2,2-bis(4-hydroxycyclohexyl)propane or bis(4-hydroxycyclohexyl)methane.

In order to render the epoxy resins water-dispersible, either an anionic, cationic or nonionic external emulsifier is added to the resin and/or an anionic, cationic or nonionic emulsifier is chemically incorporated into the epoxy resin. The nonionic emulsifiers contain repeating alkylene oXide units, preferably ethylene oxide units, and have average molecular weights between about 400 and 24,000.

Suitable nonionic external emulsifiers are disclosed in U.S. Pat. No. 4,073,762 and include those of the alkylaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type. In addition, reaction products of polyethylene glycols with aromatic diglycidyl compounds such as those disclosed in U.S. Pat. No. 3,563,493 may also be used as nonionic external emulsifiers. The epoxy resin component may contain from about 1 to 20%, preferably 2 to 15%, by weight of nonionic external emulsifier, based on the weight of the epoxy resin component.

Chemically incorporated nonionic emulsifiers are based on polyoxyalkylene glycols which are soluble or at least partially soluble in water. Polyoxyalkylene glycols are prepared conveniently by the condensation of an alkylene oxide with a suitable polyhydric alcohol. Illustrative of alkylene oxides are ethylene oxide and propylene oxide and mixtures thereof. Illustrative of polyhydric alcohols are aliphatic alcohols such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylol-propane, 1,1,1-trimethylolethane, hexane 1,2,6-triol, pentaerythritol, sorbitol, 2,2-bis(4-hydroxycyclohexyl)propane, and the like.

Preferred polyoxyalkylene glycols are those prepared by the reaction of ethylene oxide and/or propylene oxide with a dihydric aliphatic alcohol, e.g., ethylene glycol. Illustrative of polyoxyalkylene glycols are commercial Pluronic type products (available from BASF) which are block copolymers of ethylene oxide and propylene oxide of about 5000-10,000 molecular weight, containing from about 50 to about 90 weight percent ethylene oxide and about 10 to 50 weight percent propylene oxide.

The polyoxyalkylene glycols may be chemically incorporated through reaction of their hydroxyl groups with the epoxide rings of the epoxy resins as disclosed in U.S. Pat. No. 4,048,179. However, this method is not preferred since it reduces the number of epoxide groups available for cross-linking with the water-dispersible blocked polyisocyanate component of the present invention. Thus, it is preferred to convert the polyoxyalkylene glycol into its diglycidyl ether prior to chemically incorporating it into the epoxy resin. These diglycidyl ethers may be conveniently prepared by reacting epichlorohydrin with a selected polyoxyalkylene glycol in a molar proportion which provides substantially a diglycidyl ether reaction product. The epoxy resins may contain from about 1 to 20%, preferably from about 2 to 15%, by weight of chemically incorporated polyoxyalkylene glycols or their diglycidyl ethers.

A preferred epoxy resin containing chemically incorporated nonionic groups is the addition product of reactants comprising (i) about 50 to 90 parts by weight of the diglycidyl ether of a dihydric phenol, (ii) about 8 to 35 parts by weight of a dihydric phenol and (iii) about 2 to 1, parts by weight of the diglycidyl ether of a polyoxyalkylene glycol, wherein the average molecular weight of the epoxy resin is about 500 to 20,000.

Suitable compounds for preparing epoxy resins containing chemically incorporated anionic or cationic groups are those previously set forth for incorporation into the isocyanate-terminated prepolymers. These compounds may be incorporated into the epoxy resins in the same manner as the compounds containing nonionic groups. The amounts of the chemically incorporated anionic and cationic groups which are needed for water dispersibility are also the same as the amounts for the previously discussed isocyanate-terminated prepolymers.

The stable aqueous epoxy resin dispersions used according to the present invention may also contain a water-immisible $C_8$-$C_{20}$ aliphatic monoepoxide reactive diluent component as disclosed in U.S. Pat. No. 4,522,851, herein incorporated by reference.

In accordance with the process of the present invention, the blocked prepolymer and epoxy resin are dispersed in an aqueous medium such as water in known manner. The blocked prepolymer and epoxy resin may be mixed prior to dispersion in water or they may be separately dispersed in water and then blended together. One preferred method for continuously dispersing these components in water is by using a low shear dynamic mixer as disclosed in U.S. Pat. No. 4,792,095, herein incorporated by reference. While the blocked prepolymer and epoxy resin may be mixed in any quantities, a preferred composition contains about 25 to 85% by weight of the epoxy resin and about 15 to 75% by weight of the blocked prepolymer, all percentages being based on the total weight of the epoxy resin and blocked prepolymer.

The type of emulsifiers used to prepare the blocked prepolymers and epoxy resins should be compatible, i.e., anionic and cationic emulsifiers should not be mixed. However, all other combinations of anionic or cationic and nonionic chemically incorporated and external emulsifiers may be mixed.

The coatings, sealants, adhesives, caulks and elastomers of the present invention are formed by reacting the dispersed blocked prepolymer/ epoxy resin blend with a polyamine or a mixture of polyamines. The average functionality of the amine, i.e. the number of amine nitrogens per molecule, should be between about 2 and 6, preferably between about 2 and 4 and most preferably between about 2 and 3. The desired functionalities can be obtained by using mixtures of diamines and triamines. A functionality of 3.0 can be achieved either by using
 (1) triamines,
 (2) equimolar mixtures of diamines and tetramines
 (3) mixtures of 1 and 2, or
 (4) any other suitable mixtures.
These other suitable mixtures for obtaining the desired functionalities will be readily apparent to those of ordinary skill in the art.

Suitable amines are essentially hydrocarbon polyamines containing 2 to 6 amine groups which have isocyanate-reactive hydrogens according to the Zerewitinoff test, e.g., primary or secondary amino groups. The polyamines contain between about 1 to 30 carbon atoms, preferably about 2 to 15 carbon atoms. Polyamines containing aliphatically- or cycloaliphatically-bound amino groups are preferred, although polyamines containing aromatically-bound amino groups may also be used. The polyamines may be substituted, provided that they are not as reactive with isocyanate groups as the primary or secondary amines. Examples of polyamines for use in the present invention include the amines listed as low molecular compounds containing at least two isocyanate-reactive amino hydrogens, and also diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazine, N,N,N'-tris-(2-amino-ethyl)-ethylene diamine, N-[N-(2-aminoethyl)-2-aminoethyl]-N'-(2-aminoethyl)-piperazine, N-(2-aminoethyl)-N'-(2-piper-azinoethyl)-ethylene diamine, N,N-bis-(2-amino-ethyl)-N-(2-piperazinoethyl)-amine, N,N-bis(2-piperazinoethyl)-amine, polyethylene amines, iminobispropylamine, guanidine, melamine, N-(2-aminoethyl)-1,3-propane diamine, 3,3'-diamino-benzidine, 2,4,6-triamino-pyrimidine, polyoxypropylene amines, tetrapropylenepentamine, tripropylenetetramine, N,N-bis-(6-aminohexyl)-amine, N,N'-bis-(3-aminopropyl)-ethylene diamine and 2,4-bis(4'-aminobenzyl)-aniline. Preferred polyamines are 1-amino-3-aminomethyl-3,5,5-trimethyl-cyclohexane (isophorone diamine or IPDA), bis-(4-aminocyclohexyl)methane, bis-(4-amino-3-methyl-cyclohexyl)-methane, 1,6-diaminohexane, ethylene diamine, diethylene triamine, triethylene tetramine, tetraethylene pentamine, pentaethylene hexamine and hydrazine hydrate.

The amount of polyamine chain extender to be used in accordance with the present invention is dependent upon the number of blocked isocyanate groups of the prepolymer and epoxy groups in the epoxy resin. Generally, the ratio of blocked isocyanate groups and epoxy groups to the primary and secondary amino groups of the polyamine is between about 1.0:0.6 and 1.0:1.5, preferably between about 1.0:0.8 and 1.0:1.2 on an equivalent basis. Also, undue excesses of the amine are not preferred because they may lead to products with undesirably low molecular weights. For purposes of the above ratios a primary amino group is considered to have one amino hydrogen. For example, ethylene diamine has two equivalents of amino hydrogens and diethylene triamine has three equivalents.

The reaction between the dispersed blocked prepolymer/epoxy resin blend and the polyamine is generally conducted at temperatures from about 5° to 150° C., preferably from about 20° to 80° C., and most preferably at ambient temperature. The polyamines may be mixed with the dispersed prepolymer in its pure form or it may be dissolved or dispersed in water or an organic solvent. Suitable organic solvents are those previously described for use in preparing the isocyanate-terminated prepolymer.

After the aqueous blocked prepolymer/epoxy resin blend is mixed with the polyamine and introduced to a mold or applied to a substrate, the water evaporates and polyamines containing aliphatically- and/or cycloaliphatically-bound amino groups react with both the epoxy resin and the blocked prepolymer at ambient temperature without the necessity of unblocking the blocked isocyanate groups of the prepolymer elevated temperatures.

The final product is a coating, sealant, adhesive, caulk or elastomer depending upon the desired application. Suitable uses are set forth in U.S. Pat. No. 4,408,008, herein incorporated by reference.

The invention is further illustrated but is not intended to be limited by the following examples in which all parts and percentages are by weight unless otherwise specified.

EXAMPLES

Preparation of Water Dispersible Blocked Isocyanate Prepolymers

Water dispersible blocked isocyanate prepolymers "A", "B" and "C" and non-water dispersible blocked isocyanate prepolymer "D" were prepared according to the formulations listed in Table 1. A more detailed description is provided below.

TABLE 1

| Component | Prepolymer "A" | Prepolymer "B" | Prepolymer "C" | Comparison Prepolymer "D" |
|---|---|---|---|---|
| TDI | 64.8 | 64.8 | 64.8 | 64.8 |
| Polyether Polyol | 361.2 | 302.0 | 414.8 | 468.0 |
| Monofunctional Polyether | 171.6 | — | — | — |
| Dimethylolproprionic acid | — | 16.0 | 5.3 | — |
| Nonyl Phenol | 105.6 | 112.4 | 105.6 | 105.6 |
| Stannous Octoate | 0.08 | 0.08 | 0.08 | 0.08 |
| Triethylamine | — | 12.0 | 1.0 | — |
| Theoretical NCO Content (%) | 2.7 | 3.0 | 3.0 | 3.1 |
| Theoretical Blocked NCO Content (%) | 2.4 | 2.4 | 2.6 | 2.7 |

Non-ionic Water Dispersible Blocked Isocyanate Prepolymer

Prepolymer "A": Into a 1000 ml three-neck flask equipped with a mechanical stirrer and thermometer was charged TDI (which is an 80/20 weight percent mixture of the 2,4-isomer and 2,6-isomer of toluene diisocyanate). To the contents of the flask, which were maintained at 70° C., was added with stirring the appropriate amount of a polyether polyol (having secondary hydroxyl groups, an OH number of 42 and a functionality of 2.6 and prepared by alkoxylating a mixture 74 weight percent glycerine and 24 weight percent propylene glycol with a mixture of 85 weight percent propylene oxide and 15 weight percent ethylene oxide) and a monofunctional hydroxyl terminated polyether adduct of butanol, ethylene oxide and propylene oxide (weight ratio of EO to PO of 79:21) having an OH number of 26. Upon complete addition, the temperature of the reaction mixture increased to 83° C. due to the exothermic reaction of the components. The contents of the flask were cooled to 70° C. and maintained at this temperature for 2 hours or until the theoretical isocyanate content was reached. Upon reaching the theoretical isocyanate content, the blocking agent (nonyl phenol) and catalyst (stannous octoate) were added. The temperature was decreased to 50° C. and maintained at this temperature for 3 hours or until there was no detectable isocyanate content. The blocked isocyanate prepolymer was then poured from the reaction flask into a storage container, purged with nitrogen, sealed and allowed to cool to ambient temperature.

The prepolymer formed a stable, milky white dispersion when diluted with distilled water to 35% solids at ambient temperature.

Anionic Water Dispersible Blocked Isocyanate Prepolymers

Prepolymers "B" and "C": Into a 1000 ml three-neck flask equipped with a mechanical stirrer and a thermometer was charged TDI (which is the 80/20 weight percent mixture of the 2,4-isomer and 2,6-isomer of toluene diisocyanate). To the stirred contents of the flask, which were maintained at 70° C., was added the appropriate amount of the polyether polyol used to prepared Prepolymer "A" and dimethylolproprionic acid. Upon complete addition, the temperature of the reaction mixture increased slightly due to the exothermic reaction of the reactants. The contents of the flask were cooled to 70° C. and maintained at this temperature for 2 hours or until the theoretical isocyanate content was reached. Upon reaching the theoretical isocyanate content, the blocking agent (nonyl phenol) and catalyst (stannous octoate) were added and the reaction mixture was cooled to 50° C. and maintained at this temperature for 3 hours or until there was no detectable isocyanate content. The appropriate amount of triethylamine was added in order to neutralize the ionic groups in the prepolymer, thus making the prepolymer water dispersible. The prepolymer was then poured from the reaction flask into a storage container, purged with nitrogen, sealed and allowed to cool to ambient temperature.

Prepolymers "B" and "C" formed stable, milky white dispersions when mixed with distilled water to 35% solids at ambient temperature.

Non-water Dispersible Blocked Isocyanate Prepolymer

Comparison Prepolymer "D": For comparison purposes, a blocked isocyanate prepolymer that was not modified to be water dispersible was prepared. Into a 1000 ml three-neck flask equipped with a mechanical stirrer and a thermometer was charged TDI (which is the 80/20 weight percent mixture of 2,4.somer and 2,6-isomer of toluene diisocyanate). To the stirred contents of the flask, which was maintained at 70° C., was added the appropriate amount of the polyether polyol used to prepare Prepolymer "A". Upon completion of addition, the temperature of the reaction mixture increased slightly due to the exothermic reaction of the reactants. The contents of the flask were maintained at 70° C. for 2 hours or until the theoretical isocyanate content was reached. Upon reaching the theoretical isocyanate content, the blocking agent (nonyl phenol) and catalyst (stannous octoate) were added, the temperature was decreased to 50° C., and the reaction mixture was maintained at this temperature for 3 hours or until there was no detectable isocyanate content. The prepolymer was then poured from the reaction flask into a storage container, purged with nitrogen, sealed and allowed to cool to ambient temperature.

As expected, Prepolymer "D" would not disperse with distilled water at any concentration level at ambient temperature.

Preparation of Waterborne Epoxy-Urethane Systems

Waterborne epoxy-urethane systems were prepared according to the formulations shown in Table 2.

TABLE 2

Waterborne Epoxy-Urethane Formulations

| Components | FORMULATION WEIGHTS/(EQUIVALENTS) | | | | | |
|---|---|---|---|---|---|---|
| | "E" | "F" | "G" | "H" | "I" | "J" |
| Prepolymer "A" (@ 35% solids in water) | 0.0/ (0.0) | 7.5/ (0.0017) | 12.5/ (0.0028) | 25.0/ (0.0057) | 37.5/ (0.0086) | 50.0/ (0.0114) |
| Waterborne Epoxy | 50.0/ (0.027) | 42.5/ (0.023) | 37.5/ (0.020) | 25.0/ (0.0134) | 12.5/ (0.007) | 0.0/ (0.0) |
| Amine Hardener | 1.74/ (0.029) | 1.60/ (0.026) | 1.50/ (0.025) | 1.27/ (0.021) | 1.04/ (0.017) | 0.8/ (0.013) |

Waterborne epoxy-urethane formulations "F" through "I" were prepared by mixing prepolymer "A", which was reduced to 35% solids with distilled water, with the appropriate amount of bis-(4-amino-3-methylcyclohexyl)-methane (Laromin C-260, available from BASF) and a waterborne epoxy resin (CMD 35201, Celanese Corp., a non-ionic aqueous dispersion of a disphenol A epoxy resin having an epoxide equivalent weight, based on solids, of 650) at ambient temperature. Formulation "E" contained no flexibilizing isocyanate prepolymer. Formulation "J" contained no epoxy resin. Formulations "E" through "J" were then used to prepare films of varying flexibility. Tack free films were obtained when the waterborne epoxy-urethane systems were allowed to air dry at ambient temperature for 24–48 hours. The fact that Formulation J resulted in a tack free film is proof that the phenolic-blocked isocyanate groups reacted with the diamine at ambient temperature. The physical properties of these films were not tested.

10 mil thick wet films were prepared on steel panels which were baked at 140° C. for 20 minutes to ensure complete cure. Examination of the physical properties, which are summarized in Table 3, confirms the flexibilizing effect of the blocked isocyanate Prepolymer "A" on the waterborne epoxy system.

TABLE 3

| Test Method | FILM PROPERTIES | | | | | |
|---|---|---|---|---|---|---|
| | "E" | "F" | "G" | "H" | "I" | "J" |
| T-Bend 90/180 deg.[1] | fail/ fail | crazed/ crazed | crazed/ crazed | pass/ pass | pass/ pass | pass/ pass |
| Gardener Impact (forward/ reverse in lbs./sq.in.) | 10/5 | 120/ 160 | 140/ 160 | 160/ 160 | 160/ 160 | 160/ 160 |
| Pendulum Hardness[2] (sec) | 212 | 181 | 129 | 27 | 17 | 25 |
| Pencil Hardness[3] (lead type) | 2H | HB | HB | HB | 2B | 4B |

[1]T-Bend properties were determined in accordance with ASTM D4145-83.
[2]Ericksen Pendulum Hardness was determined by casting a film of the coating resin to be evaluated on a 3" × 6" steel plate with an appropriate applicator knife. The Ericksen Pendulum Hardness Tester was levelled and at the desired interval of measurement the steel plate was placed on the sample stage of the hardness tester. The fulcrum points of the pendulum were lowered on the curing film and the pendulum was deflected 6° and released. The time for the pendulum to damp to a 3° deflection was recorded.
[3]Pencil Hardness was determined according to ASTM D 3363 with a Micrometrics Co. pencil hardness gage.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueously dispersed, ambient temperature curable composition comprising
    (a) 25 to 85% by weight, based on the weight of components (a) and (b), of an epoxy resin which is rendered water-dispersible by chemically incorporated emulsifiers and/or by being admixed with external emulsifiers and
    (b) 15 to 75% by weight, based on the weight of components (a) and (b), of an isocyanate-terminated prepolymer
        (i) which is rendered water-dispersible by chemically incorporated emulsifiers and/or by being admixed with external emulsifiers,
        (ii) which is prepared from a mixture which comprises a polyisocyanate and a compound having a molecular weight of at least 500 and at least two hydroxyl groups and
        (iii) wherein the isocyanate groups are blocked with a phenolic compound,
wherein both components (a) and (b) are reactive with polyamines containing aliphatically- and/or cycloaliphatically-bound amino groups at ambient temperature.

2. The composition of claim 1 wherein said polyisocyanate comprises an aromatic diisocyanate.

3. The composition of claim 1 wherein said polyisocyanate comprises 2,4- and/or 2/6-toluylene diisocyanate.

4. The composition of claim 1 wherein said compound having a molecular weight of at least 500 comprises a polyether polyol.

5. The composition of claim 1 wherein said isocyanate-terminated prepolymer has chemically incorporated emulsifiers.

6. An aqueously dispersed, ambient temperature curable composition comprising
   (a) 25 to 85% by weight, based on the weight of components (a) and (b), of an epoxy resin which is rendered water-dispersible by chemically incorporated emulsifiers and/or by being admixed with external emulsifiers and
   (b) 15 to 75% by weight, based on the weight of components (a) and (b), of an isocyanate-terminated prepolymer
      (i) which is rendered water-dispersible by chemically incorporated emulsifiers and optionally by being admixed with external emulsifiers,
      (ii) which is prepared from a mixture which comprises a polyisocyanate component comprising an aromatic diisocyanate and a compound having a molecular weight of at least 500 and at least two hydroxyl groups and
      (iii) wherein the isocyanate groups are blocked with a phenolic compound,
wherein both components (a) and (b) are reactive with polyamines containing aliphatically- and/or cycloaliphatically-bound amino groups at ambient temperature.

7. The composition of claim 6 wherein said polyisocyanate comprises 2,4- and/or 2,6-toluylene diisocyanate.

8. The composition of claim 6 wherein said compound having a molecular weight of at least 500 comprises a polyether polyol.

9. A process for the preparation of a polyurethane which comprises blending an aqueous composition comprising
   (a) 25 to 85% by weight, based on the weight of components (a) and (b), of an epoxy resin which is rendered water-dispersible by chemically incorporated emulsifiers and/or by being admixed with external emulsifiers and
   (b) 15 to 75% by weight, based on the weight of components (a) and (b), of an isocyanate-terminated prepolymer
      (i) which is rendered water-dispersible by chemically incorporated emulsifiers and/or by being admixed with external emulsifiers,
      (ii) which is prepared from a mixture which comprises a polyisocyanate and a compound having a molecular weight of at least 500 and at least two hydroxyl groups and
      (iii) wherein the isocyanate groups are blocked with a phenolic compound,
wherein both components (a) and (b) are reactive with polyamines containing aliphatically- and/or cycloaliphatically-bound amino groups at ambient temperature.
   (c) a polyamine which is present in an amount sufficient to provide an equivalent ratio of blocked isocyanate groups and epoxy groups to primary and secondary amino groups of between 1.0 to 0.8 and 1.0 to 1.2,
and curing the blend at either ambient or elevated temperature to obtain said polyurethane.

10. The process of claim 9 wherein said blend is cured at ambient temperature.

11. A polyurethane which is prepared by a process which comprises blending an aqueous composition comprising
   (a) 25 to 85% by weight, based on the weight of components (a) and (b), of an epoxy resin which is rendered water-dispersible by chemically incorporated emulsifiers and/or by being admixed with external emulsifiers and
   (b) 15 to 75% by weight, based on the weight of components (a) and (b), of an isocyanate-terminated prepolymer
      (i) which is rendered water-dispersible by chemically incorporated emulsifiers and/or by being admixed with external emulsifiers,
      (ii) which is prepared from a mixture which comprises a polyisocyanate and a compound having a molecular weight of at least 500 and at least two hydroxyl groups and
      (iii) wherein the isocyanate groups are blocked with a phenolic compound,
wherein both components (a) and (b) are reactive with polyamides containing aliphatically- and/or cycloaliphatically-bound amino groups at ambient temperature,
   (c) a polyamine which is present in an amount sufficient to provide an equivalent ratio of blocked isocyanate groups and epoxy groups to primary and secondary amino groups of between 1.0 to 0.8 and 1.0 to 1.2,
and curing the blend at either ambient or elevated temperature to obtain said polyurethane.

12. The polyurethane of claim 11 wherein said polyisocyanate comprises an aromatic diisocyanate.

13. The polyurethane of claim 11 wherein said polyisocyanate comprises 2,4- and/or 2,6-toluylene diisocyanate.

14. The polyurethane of claim 11 wherein said compound having a molecular weight of at least 500 comprises a polyether polyol.

15. The polyurethane of claim 11 wherein said isocyanate-terminated prepolymer has chemically incorporated emulsifiers.

16. A polyurethane which is prepared by a process which comprises blending an aqueous composition comprising
   (a) 25 to 85% by weight, based on the weight of components (a) and (b), of an epoxy resin which is rendered water-dispersible by chemically incorporated emulsifiers and/or by being admixed with external emulsifiers and
   (b) 15 to 75% by weight, based on the weight of components (a) and (b), of an isocyanate-terminated prepolymer
      (i) which is rendered water-dispersible by chemically incorporated emulsifiers and optionally by being admixed with external emulsifiers,
      (ii) which is prepared from a mixture which comprises a polyisocyanate comprising an aromatic diisocyanate and a compound having a molecular weight of at least 500 and at least two hydroxyl groups and
      (iii) wherein the isocyanate groups are blocked with a phenolic compound,
      wherein both components (a) and (b) are reactive with polyamines containing aliphatically- and/or cycloaliphatically-bound amino groups at ambient temperature,
with (c) a polyamine which is present in an amount sufficient to provide an equivalent ratio of blocked isocyanate groups and epoxy groups to primary and secondary amino groups of between 1.0 to 0.8 and 1.0 to 1.2, and curing the blend at either ambient or elevated temperature to obtain said polyurethane.

17. The polyurethane of claim 16 wherein said polyisocyanate comprises 2,4- and/or 2,6-toluylene diisocyanate.

18. The polyurethane of claim 16 wherein said compound having a molecular weight of at least 500 comprises a polyether polyol.

* * * * *